(12) United States Patent
Bhattacharyya

(10) Patent No.: US 9,231,912 B2
(45) Date of Patent: Jan. 5, 2016

(54) SYSTEMS AND METHODS FOR HANDLING PACKETS FROM A TRUSTED NETWORK

(71) Applicant: Broadcom Corporation, Irvine, CA (US)

(72) Inventor: Murari Bhattacharyya, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 43 days.

(21) Appl. No.: 13/924,440

(22) Filed: Jun. 21, 2013

(65) Prior Publication Data

US 2014/0337963 A1   Nov. 13, 2014

Related U.S. Application Data

(60) Provisional application No. 61/822,819, filed on May 13, 2013.

(51) Int. Cl.
*G06F 9/00* (2006.01)
*H04L 29/06* (2006.01)

(52) U.S. Cl.
CPC ........ *H04L 63/0227* (2013.01); *H04L 63/0236* (2013.01)

(58) Field of Classification Search
None
See application file for complete search history.

(56) References Cited

U.S. PATENT DOCUMENTS

| 7,586,899 | B1 * | 9/2009 | Mohaban et al. | 370/352 |
| 2006/0212560 | A1 * | 9/2006 | Purser | 709/223 |
| 2008/0082684 | A1 * | 4/2008 | Gaos et al. | 709/238 |
| 2009/0138619 | A1 * | 5/2009 | Schnizlein et al. | 709/245 |
| 2009/0276508 | A1 * | 11/2009 | Miyake et al. | 709/220 |
| 2013/0166737 | A1 * | 6/2013 | Christenson et al. | 709/224 |

OTHER PUBLICATIONS

Juniper Networks, "Understanding DHCP Snooping for Port Security on EX-series Switches," <www.juniper.net/techpubs/en_US/junos9.3/topics/concept/port-security-dhcp-snooping.html,> Feb. 5, 2013.
Cisco Systems, "Configuring DHCP Snooping," <web.archive.org/web/20071011041114/http://cisco.com/en/US/docs/switches/lan/catalyst6500/ios/12.2SX/configuration/guide/snoodhcp.html>, Oct. 11, 2007.

* cited by examiner

*Primary Examiner* — Fatoumata Traore
(74) *Attorney, Agent, or Firm* — McDermott Will & Emery LLP

(57) ABSTRACT

Systems and methods for handling packets from a trusted network are provided. In some aspects, a system includes a communication module configured to receive a packet at a gateway from a server in a trusted network. The gateway is between the trusted network and a network external to the trusted network. The system also includes a verification module configured to determine whether the received packet is valid. The communication module is configured to route the received packet to a client in the external network if the received packet is determined to be valid. The communication module is configured to apply a corrective action to the received packet if the received packet is determined to be invalid.

20 Claims, 4 Drawing Sheets

SYSTEMS AND METHODS FOR HANDLING PACKETS FROM A TRUSTED NETWORK

CROSS-REFERENCES TO RELATED APPLICATIONS

The present application claims the benefit of U.S. Provisional Patent Application Ser. No. 61/822,819, titled "Systems and Methods for Handling Packets from a Trusted Network," filed on May 13, 2013, which is hereby incorporated by reference in its entirety for all purposes.

FIELD

The subject technology generally relates to communication networks and, in particular, relates to systems and methods for handling packets from a trusted network.

BACKGROUND

A switch may be used to bridge communications between servers in a trusted network and client devices that attempt to gain access to the trusted network (e.g., to interact with the servers and obtain their services). To protect the trusted network from malware attacks, the switch may implement security measures to monitor communications from the client devices. If the switch determines that packets from the client devices are not valid (e.g., they are part of malware attacks and/or are otherwise undesirable), the switch may prevent those packets from entering the trusted network.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, that the subject technology may be practiced without some of these specific details. In other instances, structures and techniques have not been shown in detail so as not to obscure the subject technology.

Although some security measures implemented by the switch may determine whether packets entering the trusted network are valid, these security measures do not determine whether packets being transmitted from the trusted network (e.g., outbound packets) are valid. Rather, the switch assumes that the outbound packets are valid since these packets are from the trusted network. However, if a server from the trusted network generates invalid outbound packets (e.g., the server may be compromised from an internal malware attack and/or otherwise commits an error when generating the outbound packets), the undesirable outbound packets may be routed by the switch to the client devices.

According to various aspects of the subject technology, systems and methods for handling packets from a trusted network are provided. In some aspects, outbound packets from a trusted network may be inspected to determine if they are valid before they are routed to their destinations external to the trusted network. Invalid packets, for example, may include packets that have errors, inconsistencies, corruptions, malware, and/or other undesirable features. If the outbound packets are determined to be invalid, corrective actions may be taken. In one or more implementations, if an outbound packet is determined to be invalid, the packet may be dropped, re-routed, modified, logged, reported, and/or applied with other another action. If an outbound packet is determined to be valid, the outbound packet may be routed to its intended destination external to the trusted network.

Figure 1:
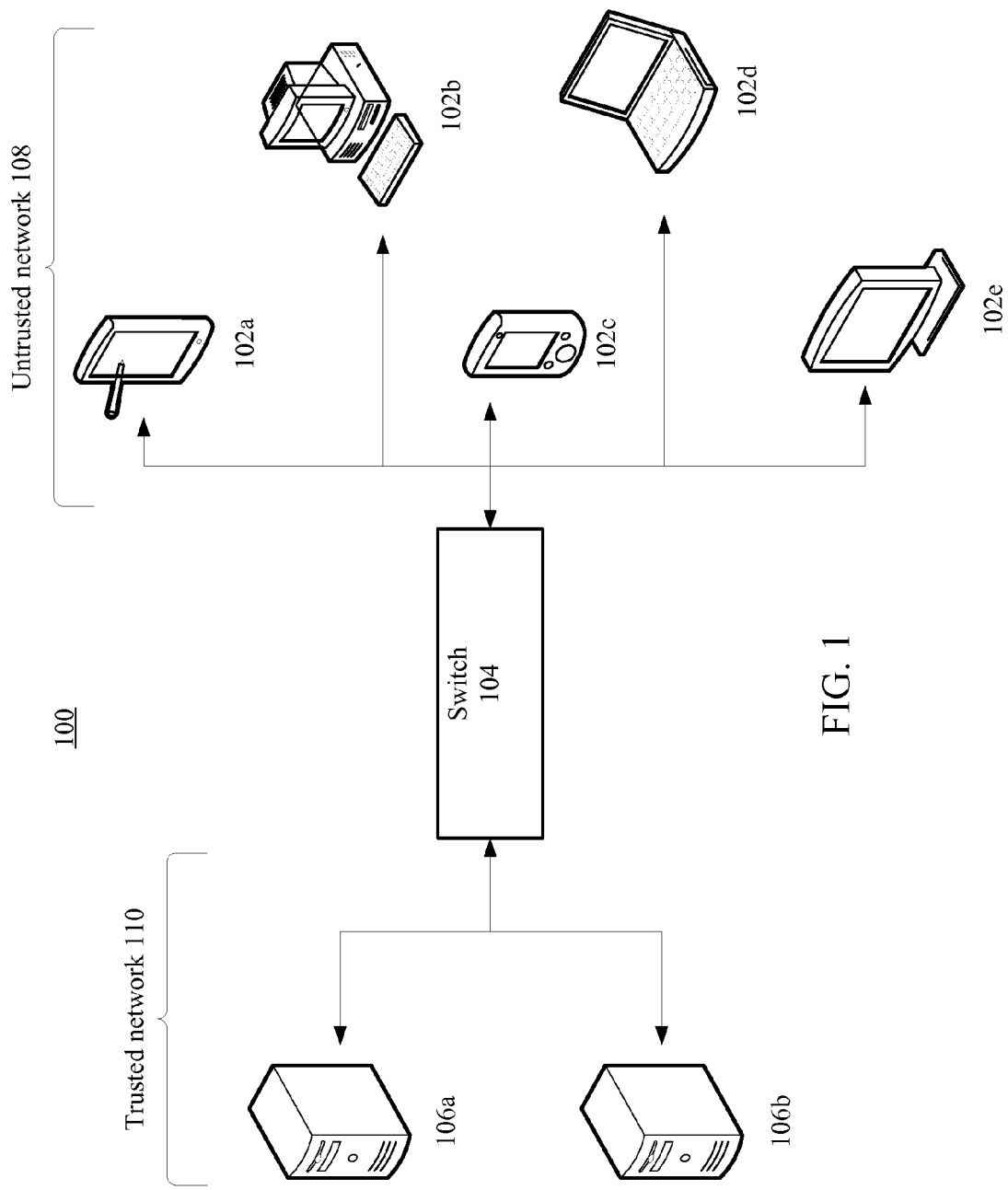
FIG. 1 illustrates an example of a general network, in accordance with various aspects of the subject technology.

FIG. 1 illustrates an example of general network 100, in accordance with various aspects of the subject technology. General network 100 includes trusted network 110 and untrusted network 108, which may be a network external to trusted network 110. General network 100 also includes switch 104, which is configured to couple trusted network 110 to untrusted network 108. Trusted network 110 includes servers 106 (e.g., servers 106a and 106b) while untrusted network 108 includes client devices 102 (e.g., client devices 102a, 102b, 102c, 102d, and 102e).

Client devices 102 and servers 106 can be any electronic device having processing hardware, memory, and communications capability. Client devices 102, for example, can be desktop computers (e.g., client device 102b), mobile computers (e.g., client device 102d), tablet computers (e.g., including e-book readers such as client device 102a), mobile devices (e.g., smartphones or personal digital assistants such as client device 102c), set top boxes (e.g., for a television with one or more processors coupled thereto and/or embedded therein such as client device 102e), video game consoles, or any other electronic devices having memory, processing hardware, and communications capabilities.

Servers 106 may be any electronic device that can provide one or more services to client devices 102. According to certain aspects, the services may include application management services (e.g., hosting programs on servers 106, deploying programs to client devices 102, etc.). In some aspects, the services may include network management services (e.g., remote authentication dial in user services, services for facilitating communications between different client devices 102, services for facilitating communications between servers 106 and client devices 102, services for assigning network addresses to client devices 102, etc.). In some aspects, the services may include access control services (e.g., implementing security measures, managing access control lists, determining which client devices 102 have access to a particular service and/or device, etc.). Although application management services, network management services, and access control services are described, it is understood that servers 106 can provide any kind of service to client devices 102.

Trusted network 110 and untrusted network 108, together, form general network 100. In one or more implementations, general network 100 may represent a home network, an office network, an enterprise network, or any other kind of network. According to certain aspects, since trusted network 110 hosts servers 106 that provide the services to the rest of general network 100, servers 106 have fewer access restrictions to the rest of general network 100 than do client devices 102. As a result, trusted network 110 may be considered trustworthy compared to untrusted network 108. In one or more implementations, devices in trusted network 110 (e.g., servers 106) are managed by administrators and/or owners of general network 100.

According to certain aspects, one manner in which trusted network 110 is distinguished from untrusted network 108 relates to a number of communications a device from each of these networks has with respect to switch 104. Untrusted network 108 may have many client devices 102 that frequently connect to and disconnect from trusted network 110 (e.g., client devices 102 may be mobile devices that allows for their frequent travel to different networks). On the other hand, trusted network 110 hosts servers 106 that are more permanently connected to switch 104 than are client devices 102 (e.g., in order to provide reliable services). As a result, trusted network 110 may host devices (e.g., servers 106) that have a greater number of communications with switch 104 than do devices hosted by untrusted network 108 (e.g., client devices 102).

According to one or more implementations, switch 104 may serve as a gateway between trusted network 110 and untrusted network 108, and may facilitate communications between these networks. For example, switch 104 may route packets from trusted network 110 to untrusted network 108, and vice versa. Although conventional switches only inspect packets entering into a trusted network for malware and/or other undesirable features, switch 104 may inspect packets that enter into trusted network 110 as well as packets that exit from trusted network 110, in accordance with various aspects of the subject technology.

Figure 2:
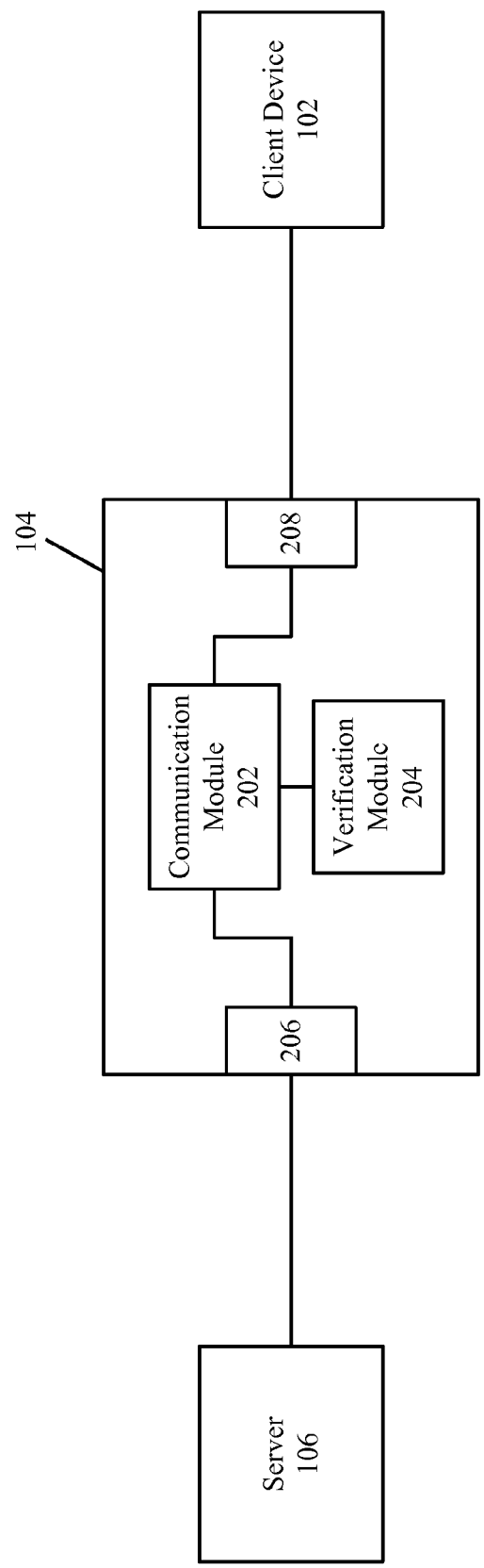
FIG. 2 is a block diagram illustrating components of a switch, in accordance with various aspects of the subject technology.

FIG. 2 is a block diagram illustrating components of switch 104, in accordance with various aspects of the subject technology. Switch 104 includes communication module 202 and verification module 204. These modules may be in communication with one another. In some aspects, the modules may be implemented in software (e.g., subroutines and code). In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure. Switch 104 also includes trusted port 206 and untrusted port 208. Communication module 202 may receive packets from and/or provide packets to server 106 via trusted port 206. Similarly, communication module 202 may receive packets from and/or provide packets to client device 102 via untrusted port 208.

Figure 3:
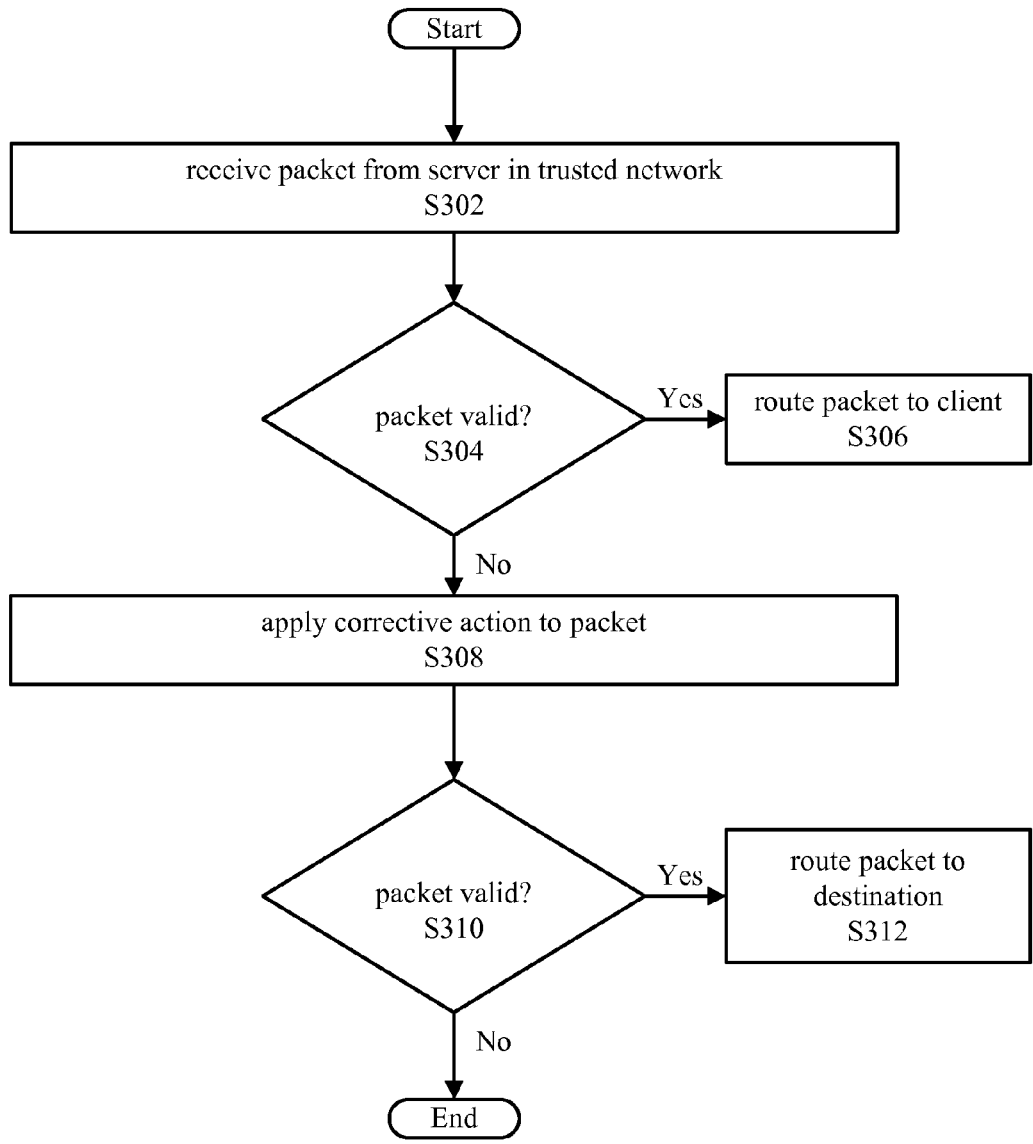
FIG. 3 illustrates an example of a method for handling packets from a trusted network, in accordance with various aspects of the subject technology.

FIG. 3 illustrates an example of method 300 for handling packets from trusted network 110, in accordance with various aspects of the subject technology. Switch 104, for example, may be used to implement method 300. However, method 300 may also be implemented by systems having other configurations. Although method 300 is described herein with reference to the examples of FIGS. 1 and 2, method 300 is not limited to these examples. Furthermore, although method 300 is illustrated in the order shown in FIG. 3, it is understood that method 300 may be implemented in a different order.

According to certain aspects, communication module 202 receives a packet from server 106 (S302). For the purposes of illustration, assume the service that server 106 provides to client device 102 is network address assignment. In this regard, server 106 may be a network address assignment server (e.g., a dynamic host configuration protocol (DHCP) server) that assigns a network address (e.g., internet protocol (IP) address) to client device 102 (e.g., a DHCP client). Thus, the received packet may include a response to a discovery request from client device 102 (e.g., a response to DHCPDISCOVER), a unique address of client device 102 (e.g., a media access control (MAC) address), a network address assignment to client device 102 (e.g., DHCPOFFER), a lease duration of the network address assignment, a network address of server 106 (e.g., an IP address of server 106), an acknowledgment of the network address assignment (e.g., a DHCPACK in response to a DHCPREQUEST), and/or other parameters relevant to the network address assignment. Although server 106 is described as a network address assignment server, it is understood that server 106 may be a different server that provides a different service to client device 102, and therefore may transmit different types of packets.

According to certain aspects, verification module 204 determines whether the received packet is valid (S304). If the received packet is determined to be valid, it may be considered authorized for transmission. As a result, communication module 202 routes the packet to client device 102 (S306). However, if the received packet is determined not to be valid, verification module 204 applies a corrective action to the received packet (S308).

Because malware and/or errors may cause a packet to have various undesirable features, a number of different criteria may be used to determine whether the received packet is valid. In some aspects, verification module 204 determines whether the received packet is valid by determining whether the received packet is from a pre-authorized source (e.g., a particular server may be allowed to transmit outbound packets from trusted network 110 while another server may not). In some aspects, verification module 204 determines whether the received packet is valid by determining whether the received packet is in a pre-authorized format (e.g., encrypted packets may be allowed to transmit while un-encrypted packets may not). In some aspects, verification module 204 determines whether the received packet is valid by determining whether the received packet comprises a parameter outside of a pre-authorized range (e.g., packets that are network address assignments within a pre-authorized address range may be allowed to transmit while packets that are network address assignments outside of this address range may not; packets that have lease durations within a pre-authorized duration may be allowed to transmit while packets that have lease durations outside the pre-authorized duration may not; packets with keys that are within a pre-authorized key range may be allowed to transmit while packets with keys that are not within the pre-authorized key range may not; packets having sizes within a pre-authorized size range may be allowed to transmit while packets having sizes outside of this pre-authorized size range may not; packets being sent within a pre-authorized time range may be allowed to transmit while packets being sent outside of this pre-authorized time range may not; packets being sent at rates within a pre-authorized rate range may be allowed to transmit while packets being sent at rates outside the pre-authorized rate range may not; etc.)

In some aspects, verification module 204 determines whether the received packet is valid by determining whether a destination of the received packet is a pre-authorized destination (e.g., packets may be allowed to be transmitted to a particular destination/port but not to another destination/port). In some aspects, verification module 204 determines whether the received packet is valid by determining whether the received packet is a duplicate (e.g., a packet that is not a duplicate of a recently sent packet (to the same destination)

may be allowed to transmit while a packet that is a duplicate may not; a packet that is a network address assignment that is different from a recent network address assignment (with an unexpired lease duration) may be allowed to transmit while a packet that is a duplicate of the recent network address assignment may not; etc.). Although the foregoing criteria are described, it is understood that different criteria may be used to determine whether the received packet is valid.

According to certain aspects, a table may be used to determine whether the received packet is valid. In one or more implementations, the table may be stored at switch 104, and may include one or more entries that indicate criteria that allow the received packet to be transmitted. Verification module 204 may compare the received packet to the one or more entries, and if a match is found, the received packet may be determined to be valid. For example, the table may be an IP address assignment table. If the received packet is an IP address assignment that matches an entry in the table, the received packet may be considered valid.

As discussed above, if the received packet is determined to be valid, communication module 202 routes the received packet to client device 102 (S306). If not, verification module 204 applies a corrective action to the received packet (S308). According to one or more implementations, the corrective action may include dropping the packet, modifying the packet (e.g., changing the packet's destination, size, format, rate, key, transmission time, etc.), returning the packet to its source (e.g., server 106), logging information associated with the packet, reporting the information associated with the packet, and/or applying another action to the packet in an attempt to render the packet valid. The information, for example, may include details as to why the packet is invalid. This information may be logged and reported to server 106 and/or an administrator. In some implementations, the information can be sent via simple network management protocol (SNMP) traps to certain accounting, security, and/or law enforcement firms.

According to certain aspects, verification module 204 determines whether the packet, with the corrective action applied thereto, is valid (S310). In some aspects, verification module 204 may use the same or similar criteria as discussed with respect to S304 to determine whether such a packet is valid. If so, communication module 202 routes the packet to its intended destination (S312), which may or may not be client device 102. For example, if the received packet was determined in S304 to be invalid because it had an incorrect destination (e.g., client device 102 was not the correct destination), then verification module 204, in S308, may modify the destination of the received packet to a correct destination that is not client device 102. In this regard, communication module 202, in S312, may route the packet to the correct destination.

According to certain aspects, if verification module 204 determines that the packet, with the corrective action applied thereto, is not valid, then method 300 may terminate. Although communication module 202 and verification module 204 are described as inspecting and processing packets from server 106 to client device 102, it is understood that communication module 202 and verification module 204 may perform the same or similar inspection and processing of packets from client device 102 to server 106. According to certain aspects, some or all of the steps described with respect to method 300 may be performed automatically (e.g., without user input during implementation).

Figure 4:
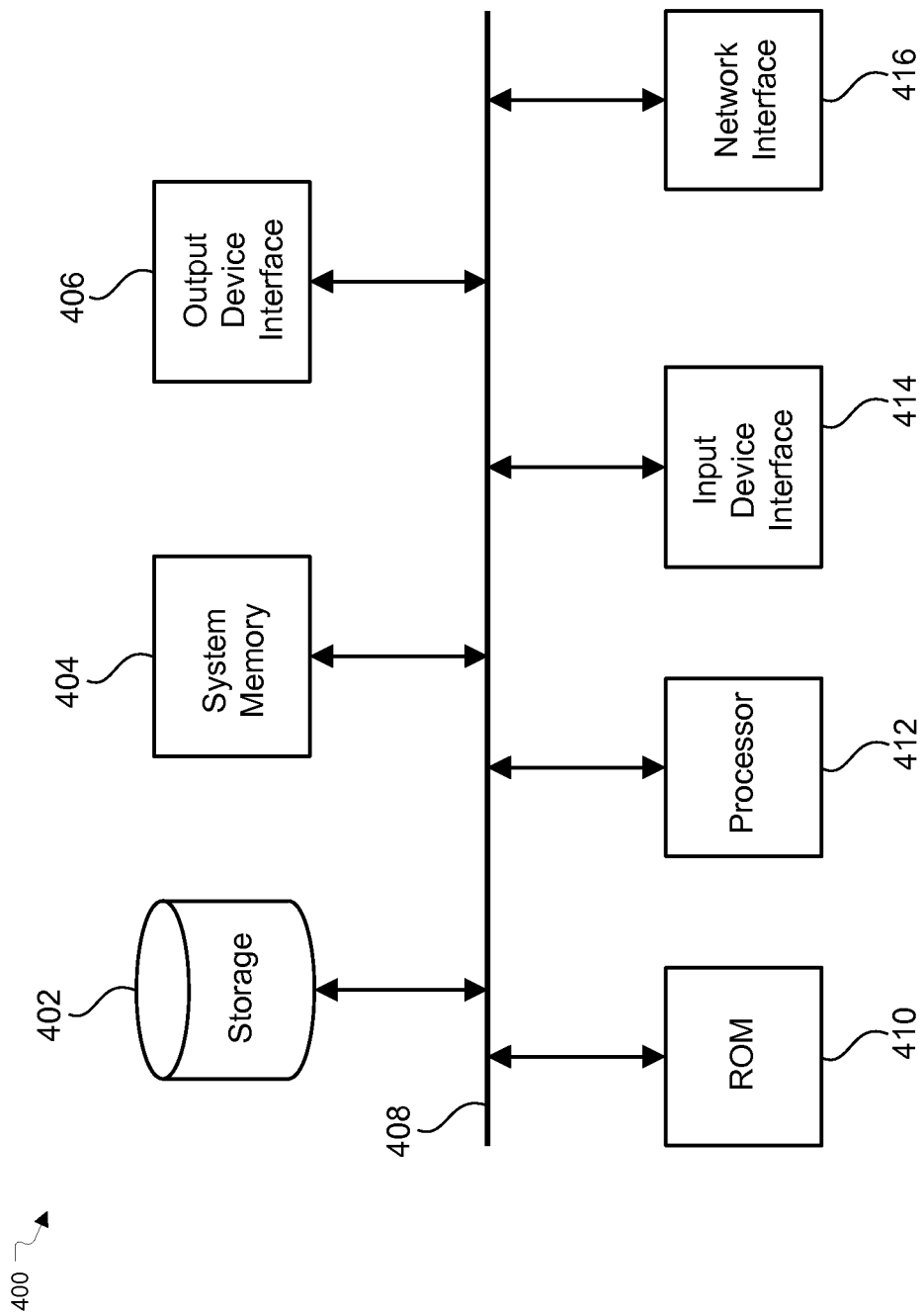
FIG. 4 conceptually illustrates an electronic system with which aspects of the subject technology may be implemented.

FIG. 4 conceptually illustrates electronic system 400 with which aspects of the subject technology may be implemented. Electronic system 400, for example, can be a computer, a server, a switch, a router, any device for handling packets from a trusted network, or generally any electronic device that transmits signals over a network. Such an electronic system includes various types of computer readable media and interfaces for various other types of computer readable media. Electronic system 400 includes bus 408, processing unit(s) 412, system memory 404, read-only memory (ROM) 410, permanent storage device 402, input device interface 414, output device interface 406, and network interface 416, or subsets and variations thereof.

Bus 408 collectively represents all system, peripheral, and chipset buses that communicatively connect the numerous internal devices of electronic system 400. In one or more implementations, bus 408 communicatively connects processing unit(s) 412 with ROM 410, system memory 404, and permanent storage device 402. From these various memory units, processing unit(s) 412 retrieves instructions to execute and data to process in order to execute the processes of the subject disclosure, such as method 300. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. One or more implementations of the subject disclosure use a mass-storage device (such as a magnetic or optical disk and its corresponding disk drive) as permanent storage device 402.

Other implementations use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such as random access memory. System memory 404 stores any of the instructions and data that processing unit(s) 412 needs at runtime. In one or more implementations, the processes of the subject disclosure are stored in system memory 404, permanent storage device 402, and/or ROM 410. From these various memory units, processing unit(s) 412 retrieves instructions to execute and data to process in order to execute the processes of one or more implementations. In some aspects, storage device 402, system memory 404, and/or ROM 410 may be used to store the packet, the criteria, the table, and/or other information for implementing aspects of the subject technology.

Bus 408 also connects to input and output device interfaces 414 and 406. Input device interface 414 enables a user to communicate information and select commands to the electronic system. Input devices used with input device interface 414 include, for example, alphanumeric keyboards and pointing devices (also called "cursor control devices"). Output device interface 406 enables, for example, the display of images generated by electronic system 400. Output devices used with output device interface 406 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 4, bus 408 also couples electronic system 400 to a network (not shown) through network interface 416. In this manner, the computer can be a part of a network of computers (such as a local area network ("LAN"), a wide area network ("WAN"), or an Intranet, or a network of networks, such as the Internet. Any or all components of electronic system 400 can be used in conjunction with the subject disclosure.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. In one or more implementations, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more implementations, the computer readable media is non-transitory computer readable media, computer readable storage media, or non-transitory computer readable storage media.

In one or more implementations, a computer program product (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to analyze and control an operation or a component may also mean the processor being programmed to analyze and control the operation or the processor being operable to analyze and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A system for handling packets from a trusted network, the system comprising:
    at least one processor circuit configured to:
        receive a packet at a gateway from a server in a trusted network, wherein the gateway is between the trusted network and a network external to the trusted network;
        determine whether the received packet is valid;
        route the received packet to a client in the external network when the received packet is determined to be valid;
        apply a corrective action to the received packet when the received packet is determined to be invalid, wherein the corrective action comprises modifying the received packet;
        determine whether the received packet having been modified by the corrective action applied thereto is valid; and
        route the received packet, having been modified by the corrective action applied thereto, to the client in the external network when the received packet, with the corrective action applied thereto, is determined to be valid, wherein the received packet, having been modified by the corrective action applied thereto, is not routed to the client in the external network when the received packet, with the corrective action applied thereto, is determined to be invalid.

2. The system of claim 1, wherein the server is a network address assignment server, and wherein the packet comprises at least one of a response to a discovery request from the client, a unique address of the client, a network address assignment to the client, a lease duration of the network address assignment, a network address of the server, and an acknowledgment of the network address assignment.

3. The system of claim 2, wherein the network address assignment server is a dynamic host configuration protocol (DHCP) server, wherein the client is a DHCP client, wherein the unique address is a media access control (MAC) address, wherein the network address assignment is an internet protocol (IP) address assignment, and wherein the network address of the server is an IP address of the server.

4. The system of claim 1, wherein the trusted network is configured to host a first device that provides a service to a second device in the external network, wherein the first device comprises the server, and wherein the second device comprises the client.

5. The system of claim 4, wherein the service comprises at least one of an application management service, a network management service, and an access control service.

6. The system of claim 1, wherein the trusted network is configured to host a first device having a number of communications with the gateway that is greater than a number of communications between the gateway and a second device in the external network, wherein the first device comprises the server, and wherein the second device comprises the client.

7. The system of claim 1, wherein the trusted network and the external network form a general network.

8. The system of claim 7, wherein the trusted network is configured to host a first device having fewer access restrictions within the general network than does a second device in the external network, wherein the first device comprises the server, and wherein the second device comprises the client.

9. The system of claim 7, wherein the general network comprises at least one of a home network, an office network, and an enterprise network.

10. The system of claim 1, wherein determining whether the received packet is valid comprises determining at least one of (a) whether the received packet is from a pre-authorized source, (b) whether the received packet is in a pre-authorized format, (c) whether the received packet comprises a parameter outside of a pre-authorized range, (d) whether a destination of the received packet is a pre-authorized destination, and (e) whether the received packet is a duplicate.

11. The system of claim 1, wherein the corrective action comprises at least one of 1) dropping the packet, 2) modifying the packet, 3) returning the packet to the server, 4) logging information associated with the packet, and 5) reporting the information associated with the packet.

12. The system of claim 11, wherein the information associated with the packet is reported to at least one of the server and an administrator.

13. The system of claim 1, wherein the at least one processor circuit is further configured to determine whether the packet, with the corrective action applied thereto, is valid.

14. The system of claim 13, wherein the corrective action comprises modifying at least one of a destination, a size, a format, a rate, a key, or a transmission time of the received packet.

15. A method for handling packets from a trusted network, the method comprising:
    receiving a packet at a gateway from a server in a trusted network, wherein the gateway is between the trusted network and a network external to the trusted network;
    determining whether the received packet is valid;
    routing the received packet to a client in the external network when the received packet is determined to be valid;
    applying a corrective action to the received packet when the received packet is determined to be invalid, wherein the corrective action comprises modifying the received packet;
    determine whether the received packet having been modified by the corrective action applied thereto is valid; and
    routing the received packet, having been modified by the corrective action applied thereto, to the client in the external network when the received packet, with the corrective action applied thereto, is determined to be valid, wherein the received packet is not routed to the client in the external network when the received packet with the corrective action applied thereto is determined to be invalid.

16. The method of claim 15, wherein determining whether the received packet is valid comprises comparing the received packet to an entry in a table, and wherein the received packet is determined to be valid if the received packet matches the entry.

17. The method of claim 16, wherein the table is stored in the gateway.

18. A non-transitory machine-readable medium comprising instructions for a method of handling packets from a trusted network, the method comprising:

receiving a packet at a switch from a network address assignment server in a trusted network, wherein the switch is between the trusted network and a network external to the trusted network, wherein the packet comprises at least one of a response to a discovery request from a client in the external network, a unique address of the client, a network address assignment to the client, a lease duration of the network address assignment, a network address of the network address assignment server, and an acknowledgment of the network address assignment;

determining whether the received packet is valid;

routing the received packet to the client in the external network if the received packet is determined to be valid;

applying a corrective action to the received packet if the received packet is determined to be invalid;

determine whether the received packet having been modified by the corrective action applied thereto is valid; and routing the received packet, having been modified by the corrective action applied thereto, to the client in the external network when the received packet, with the corrective action applied thereto, is determined to be valid, wherein the received packet, having been modified by the corrective action applied thereto, is not routed to the client in the external network when the received packet, with the corrective action applied thereto, is determined to be invalid.

19. The machine-readable medium of claim 18, wherein the corrective action comprises at least one of 1) dropping the packet, 2) modifying the packet, 3) returning the packet to the server, 4) logging information associated with the packet, and 5) reporting the information associated with the packet.

20. The machine-readable medium of claim 19, wherein modifying the packet comprises modifying a destination of the packet, and wherein the method further comprises routing the packet to the modified destination.

* * * * *